May 28, 1946.  B. J. CAMPBELL ET AL  2,401,049
METHOD OF MAKING ELECTRICAL STRAIN GAUGES
Filed Dec. 13, 1943  2 Sheets-Sheet 1
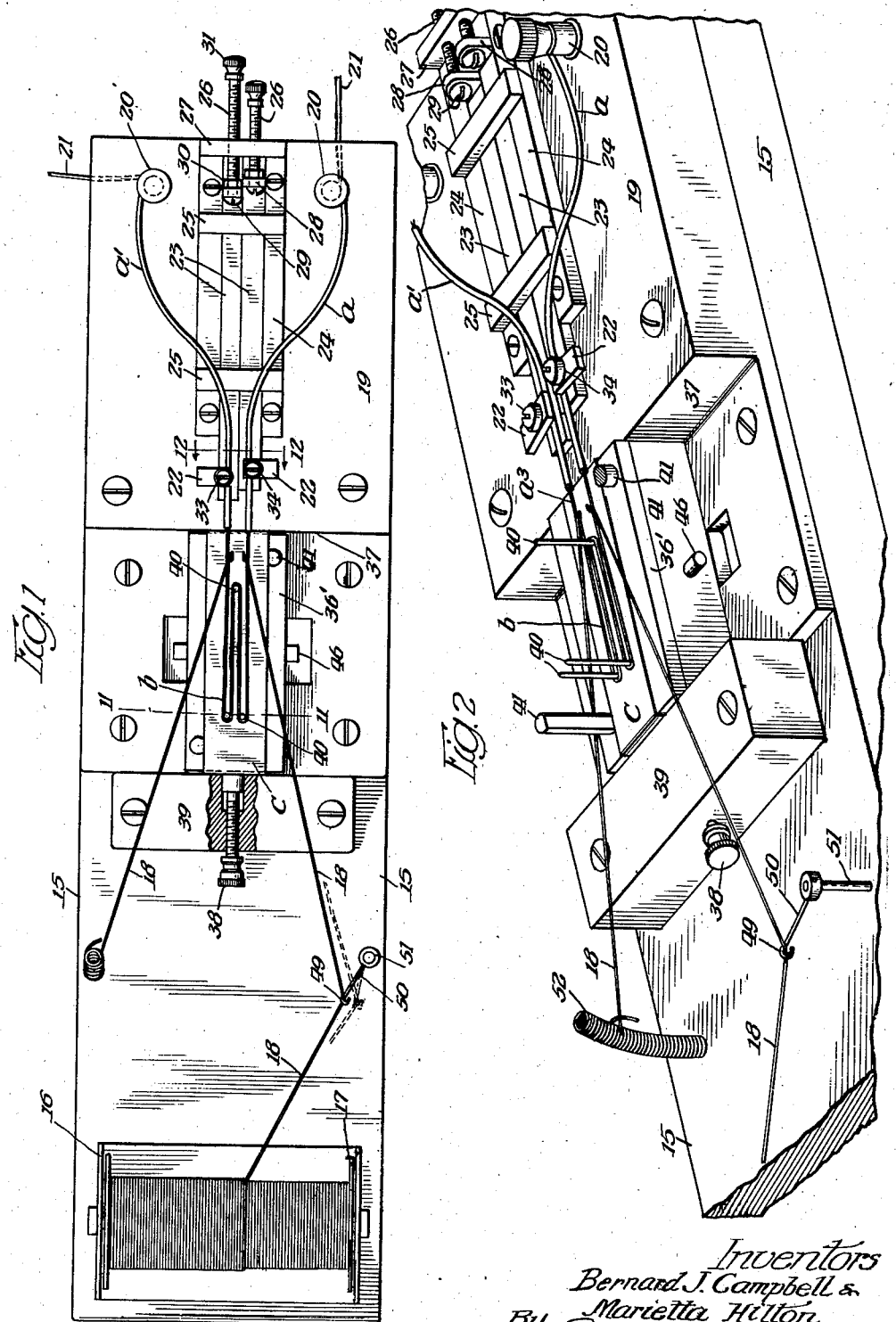
Inventors
Bernard J. Campbell &
Marietta Hilton
By Fred Gerlach their Atty

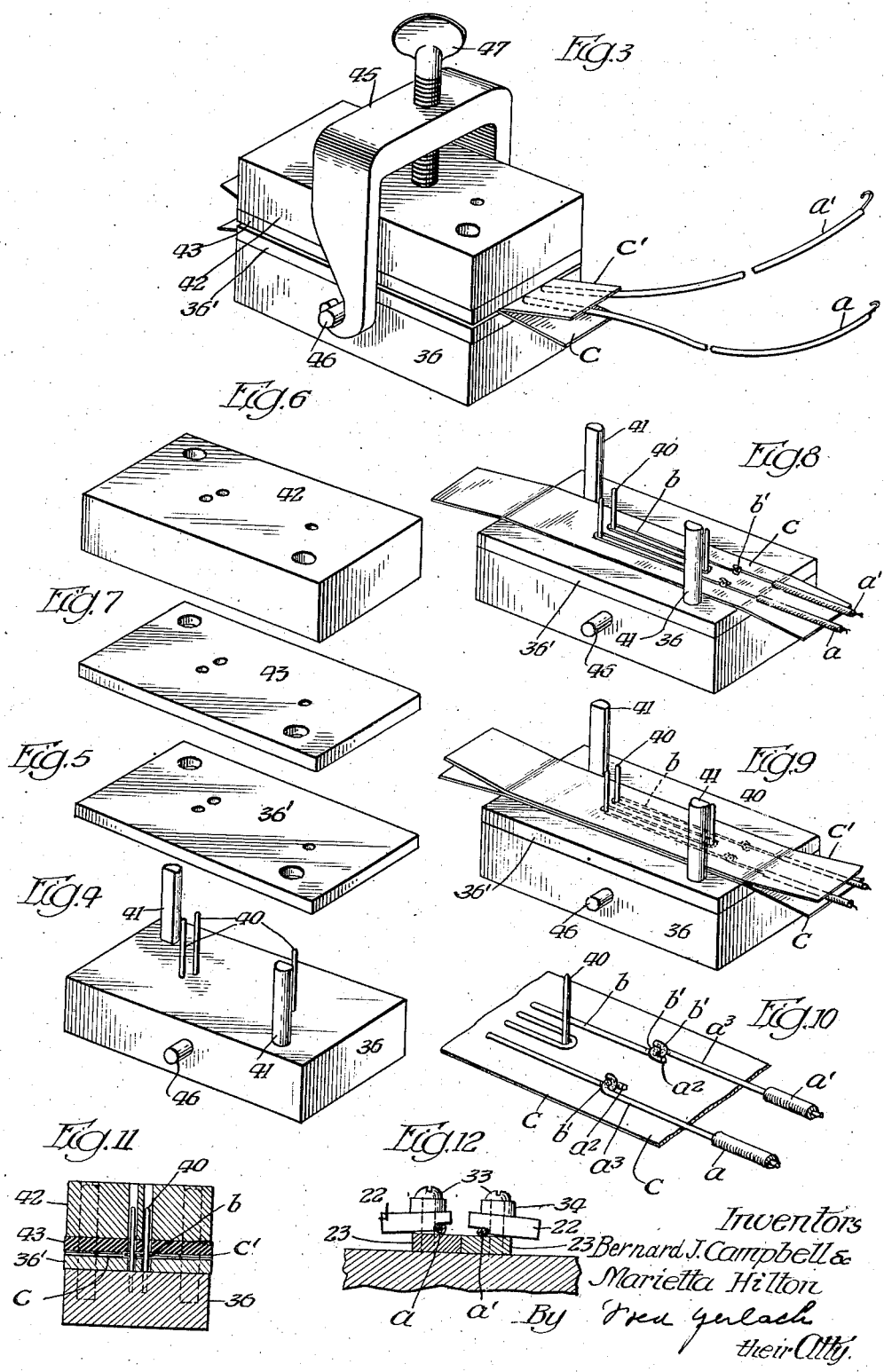

Patented May 28, 1946

2,401,049

UNITED STATES PATENT OFFICE 2,401,049

METHOD OF MAKING ELECTRICAL STRAIN GAUGES

Bernard J. Campbell and Marietta Hilton, San Diego, Calif., assignors to Consolidated Vultee Aircraft Corporation, San Diego, Calif., a corporation of Delaware Application December 13, 1943, Serial No. 514,118

7 Claims. (Cl. 140—71)

The invention relates to the fabrication of electrical strain gauges.

Strain gauges for measuring minute deflections of the surfaces to which they are attached are usually in the form of thin flexible patches composed of two cover strips or sheets of thin paper, such as "onion skin," cemented together with a resistance element formed of a predetermined length of resistance wire interlaid between the sheets, the ends of which are joined to the lead-conductors for connection to an electrical supply circuit. When used, these gauges are cemented as flat patches to a surface on the structure to be tested with which they become integral and the resistance elements must be extremely sensitive for variation of the resistance in the circuit resulting from slight or minute deflection of the surface to which they are attached. An imperceptible variation in the length of this resistance wire through stretching, contraction, or deflection will alter its resistance value sufficiently for registering the variation in resistance on a galvanometer. This renders it important to provide extreme accuracy in the normal length or in the resistance value of the element during fabrication of the complete unit and to protect it from strains until it is ready for use.

One object of the invention is to provide an improved method for expediting the manufacture of electrical strain gauges and by which accuracy in resistance value of the resistance element can be readily and accurately controlled.

Other objects of the invention will appear from the detailed description.

The invention consists in the several novel features which are hereinafter set forth and more particularly defined by claims at the conclusion hereof.

In the drawings:

Fig. 1 is a plan of an apparatus embodying the invention and which is used for carrying out the improved method.

Fig. 2 is a perspective, parts being broken away.

Fig. 3 is a perspective of the jig with an assembled strain gauge clamped therein.

Fig. 4 is a perspective of the bed-block of the jig.

Fig. 5 is a perspective of the plate or sheet of insulation which fits over the bed-block of the jig.

Fig. 6 is a perspective of the top or clamping section of the jig.

Fig. 7 is a perspective of the resilient mat which is placed over the cover-strip and fits under the top section of the jig.

Fig. 8 is a perspective illustrating the lower cover-strip on the bed and the resistance element wound to form the resistance element and secured to the ends of the lead-conductors.

Fig. 9 is a similar view after the top cover-strip has been cemented to the underlying strip and over the resistance element and the lead-conductors.

Fig. 10 is a perspective on an enlarged scale illustrating the connections between the ends of the resistance element and the lead conductors.

Fig. 11 is a section taken on line 11—11 of Fig. 1 after the jig has been assembled for clamping the gauge while the cement is cured or dried.

Fig. 12 is a section taken on line 12—12 of Fig. 1.

The invention provides for fabricating a strain gauge which comprises a pair of lead-conductors $a$, $a'$, a resistance element $b$ which consists of a strip of wire wound or looped to any desired shape, usually with a series of connected loops. This element is interlaid and cemented between cover sheets $c$, $c'$ which are cemented together with the ends of the resistance element secured by soldering at $b'$ to the bared ends $a^3$ of the lead conductors $a$, $a'$, respectively, which are provided with hooks $a^2$ or suitable means through which the ends of the element are adapted to be looped.

The invention is exemplified in apparatus which comprises a base 15 on which the operative parts are supported. A bracket 16 is mounted on one end of the base 15 for supporting a reel or spool 17 of resistance wire 18 which is drawn from the spool in successively making the strain gauges. A base-member 19 is fixed on the other end portion of the base 15. Binding posts 20, to which the lead-conductors $a$, $a'$ for the strain gauges are adapted to be connected, are secured in the base and are connected by conductors 21 to a galvanometer (not shown) of usual construction, or other instrument for measuring and indicating the resistance value in the finished strain gauge. The unbared portion of each of the lead-conductors adjacent its hook $a^2$ is detachably gripped in a clamp 22. Each clamp 22 is mounted on a bar 23 which is longitudinally slidable for shifting the clamp mounted thereon independently and adjusting the hooked end $a^2$ of one lead-conductor around which wire 18 is looped. Bars 23 are confined for longitudinal sliding movement on the base-member 19 between guide bars 24 and cross-bars 25 which are fixed to the bars 24. Each of the adjusting bars 23 is adjustable longitudinally by a screw 26 which is screw threaded to an end flange 27 between the bars 24. The inner end of each screw 26 is connected to longitudinally adjust said bar by a screw 29 and a nut 30. The outer end of each screw is provided with a thumb wheel 31 whereby the screw may be rotated to impart sliding movement to the bar 23 to which it is connected. Each clamp 22 is connected to one of the adjustable bars 23 by a screw 33 and a rubber washer 34 around the screw which presses the clamp downwardly to detachably grip a lead-conductor and secure it on bar 23. The clamps 22 can be raised to facilitate the insertion and removal of the lead-conductor. The inner end $a^3$ of each lead-conductor is bared of insulation and provided with a hook $a^2$ for conductive connection to the resistance element. The other end of each lead-conductor is also bared for conductive connection to the binding posts 20. This exemplifies a construction in which the hook ends $a^2$ of the lead-conductors which are gripped by the clamps 22 may be independently adjusted longitudinally, and are adapted to receive loops of the wire forming the resistance element.

A jig is provided for clamping the assembled gauge for drying the cement or adhesive used to bond the cover sheets together. This jig comprises a bed on which the cover strip $c$ is laid. This bed comprises a rectangular block 36 of electrically non-conductive material and a plate or sheet 36' of Micarta or other heat resisting and electrically non-conductive material which fits on the top of the block 36. A series of vertical pins 40 have their lower ends fixed in the block 36, extend through holes in the plate 36' and through the cover-strip and project above the bed and constitute means around which the wire may be wound or looped to form the resistance element $b$ of the desired length or with the resistance value desired in the gauge. The bed composed of block 36 and plate 36' is adapted to be removably secured on the base between an abutment 37 and a thumb screw 38 which is screw threaded to a block 39. The cover-strip $c$ is laid on the bed and its ends are downturned and confined between the sides of the block 36, the abutment 37 and the screw 38, and the pins 40 pass through the cover-strip $c$ so that the cover-strip $c$ will be firmly and flatly held on the bed.

The jig comprises an upper block 42 of electrically non-conductive material for applying clamping pressure to the assembled strain gauge on the bed. An elastic mat 43 of non-conducting soft rubber fits under the block 42 for engaging the top cover-strip $c'$. Said mat is provided with holes through which the forming pins 40 and the guide posts 41 are adapted to pass. Block 42 is provided with holes for posts 41 which guide said blocks rectilinearly to and from the bed. The mat 43 provides a resilient clamping surface, and distributes the pressure from block 42 over the uneven surface resulting from the interlaying of the resistance wire between the strips $c$ and $c'$. A clamp 45 is provided with hooks for engaging studs 46 on the sides of block 36 straddles the block 42 and mat 43, and is provided with a screw 47 for clamping the assembled strain gauge in the jig.

The wire 18 from spool 17 is led through and is guided by a hook 49 on a resilient arm 50 which is mounted at the upper end of a post 51, the lower end of which is secured in the base 15. In winding or looping the wire 18 to form the resistance element $b$, the wire is drawn from the spool 17 through hook 49, looped around the hook $a^2$ on the lead-conductor $a$, thence successively around the series of forming pins 40, thence around the hook $a^2$ on the lead-conductor $a'$ and the free end of the wire is then hooked to a resilient tension device. This device consists of a vertically extending coil spring 52, the lower end of which is fixedly secured in the base 15 and the upper end of which is free to flex transversely. By hooking the free end of wire 18 to a coil of the spring 52 in greater or less distance from its fixed lower end, its lever action may be decreased or increased to vary the tension on the wire, according to that desired for wire 18 of different diameters. This spring 52 is closely wound so that fine wire will be frictionally gripped or wedged between its coils. The diameter of this wire may be .001" in thickness and this spring provides a quick and easy method of securing the end of the wire and for varying the force of the spring for proper degree of tension on wire of various sizes and types, by selective connection of the wire to different coils which increases or decreases the lever action of the spring. By utilizing the lever action of the spring, a more rugged spring, which is less likely to be damaged, can be used to provide the very sensitive tension required. The drag on the spool 17 and the resiliency of hook 50 are sufficient to keep the reach of wire between the spool and the jig under the desired tension after the wire has been wound around the forming pins 40 and its free end has been attached to the spring 52.

The method of making strain gauges and the operation of the apparatus are as follows: A cover-strip $c$ will be placed on the bed composed of assembled plate 36' and block 36 and pressed down over the forming pins 40 and between the guide posts 41, with its ends downturned. The bed will then be clamped between abutment 37 on the base-member 19 and the screw 38 with the downturned ends of the cover strip held against the ends of the bed so that it will be flat on the bed. A pair of lead-conductors $a, a'$ are bared at $a^3$ and bent to form a hook $a^2$. The other end of the lead wires may also be bared and each secured to one of the binding posts 20. The insulated portion of each lead conductor will then be placed into and gripped by one of the clamps 22 with its bared end $a^3$ and hook $a^2$ overlying one end portion of the cover sheet $c$, as illustrated in Fig. 2. The wire 18 from guide hook 49 will be looped around the hook $a^2$ of the lead-conductors $a$ and thence successively around the forming pins 40, thence around the hook $a^2$ on the lead-conductor $a'$ and its free end will be hooked around the spring 52 and between the coils thereof, so the spring will exert sufficient tension on the wire to hold it taut without stretching the wire. The galvanometer connected to the binding posts 22 will then be switched to measure and indicate the resistance value of the element $b$ which has been formed between the hooks $a^2$ of the lead-conductors while the wire remains under tension to cause it to retain its contour. If the resistance measurement is plus, the operator will adjust screws 31 to move one or both of the bars 24 inwardly and cause the length of wire between hooks $a^2$ to be shortened while the surplus of wire is taken up by spring 52 which keeps the wire until the indicated resistance value on the galvanometer is the same as that desired in the strain gauge. If the indicated measurement resistance value is minus, either or both of the screws 31 will be adjusted to increase the length of the wire between hooks $a^2$ until the correct resistance is indicated. The spring 52 will then be flexed for this increase. The element b will then have the desired predetermined resistance value. Next, the operator will coat the exposed surface of the cover strip c and the resistance element thereon, with a thin film of liquid adhesive such as "Duco household cement" or "Radio service cement" while the bed of the jig remains in fixed position on the base. Next, the operator will fixedly join the hooks $a^2$ of the lead conductors to the resistance wire at the ends of the element by drops of solder, as indicated at $a^4$. The free end of the resistance wire will be severed at the outer side of one of the hooks $a^2$ and the supply end of the wire will be severed at the outer side of the other hook $a^2$ and both will be removed from the jig. Next, the cover strip c' will be pressed over pins 40 and against the adhesive on the strip c and between the guide posts 41. Next, the rubber mat 43 will be placed on the top cover sheet c' and the block 42 will be placed on the mat, the mat and said jig section being guided by the posts 41. The hook clamp 45 is then hooked around the studs 46 on block 36 and the clamp screw 47 is tightened to firmly clamp the cover strips c c' and the interlaid resistance element together for holding the assembled gauge while the cement is being cured to set and form a permanent bond between the cover sheets and the resistance element. The jig can be placed in an oven for expediting the curing and setting of the cement until the cover sheets are permanently bonded together. The gauge can be removed from the jig by loosening the clamp screw 47 and disconnecting the clamp from studs 46, so that the block 42 and mat 43 can be lifted off pins 40 and posts 41. The completed strain gauge is then stripped off the forming pins 40 and will be in readiness for use. While one strain gauge is being dried and cured, the operation can be continued by using another jig, any number of which can be provided, so that the assembling of the gauges can proceed continuously.

The invention provides a method of making strain gauges composed of a looped or wound resistance element and cover sheets with attached lead wires by which the resistance value of the element may be accurately and easily controlled; by which the assembling operation will be correctly expedited to effect a saving of labor, and which are particularly adapted for high production. The apparatus is simple in construction and efficient and economical in operation.

The invention is not to be understood as restricted to the details set forth since these may be modified within the scope of the appended claims without departing from the spirit and scope of the invention.

Having thus described the invention, what we claim as new and desire to secure by Letters Patent is:

1. That improvement in making electrical strain gauges having cover-strips with an interlaid resistance element and with lead-conductors attached to the ends of the element which comprises, winding, to form the resistance element, a strand of wire over a cover-strip and looping it around the ends of a pair of lead-conductors, retaining the loops of wire under yielding tension, varying, by adjustment of one of the conductors, the length of wire in the element between the loops around the ends of the conductors to the resistance value desired, and joining together the loops on the wire and the ends of the conductors while they are held under tension in their adjusted relation.

2. That improvement in making electrical strain gauges having cover-strips with an interlaid resistance element and with lead conductors attached to the ends of the element which comprises, winding, to form the resistance element, a strand of wire over a cover-strip and looping it around the ends of a pair of lead-conductors, retaining the loops of wire under yielding tension, varying, by adjustment of the conductors, the length of the wire in the element between the loops around the ends of the conductors to the resistance value desired, and joining together the loops on the wire and the ends of the conductors while they are held under tension in their adjusted relation.

3. That improvement in making electrical strain gauges having cover-strips with an interlaid resistance element and with lead-conductors attached to the ends of the element which comprises, winding, to form the resistance element, a strand of wire over a cover-strip and looping it around the ends of a pair of lead-conductors, retaining the loops of wire under yielding tension, measuring the resistance value in the element, varying by adjustment of the conductors, the length of the wire in the element between the loops around the ends of the conductors relatively to the measured value for the predetermined resistance value desired, and joining together the loops on the wire and the ends of the conductors while they are held under tension in their adjusted relation.

4. That improvement in making electrical strain gauges having cover-strips with an interlaid resistance element and with lead-conductors attached to the ends of the element which comprises, winding, to form the resistance element, a strand of wire over one of the cover-strips and looping it around the ends of a pair of lead-conductors, retaining the loops of wire under yielding tension, varying by adjustment of the conductors, the length of the wire in the element between the loops around the ends of the conductors to the resistance value desired, joining together the loops on the wire and the ends of the conductors while they are under tension in their adjusted relation, and severing the wire at the outer side of the joints.

5. That improvement in making electrical strain gauges having cover strips with an interlaid resistance element and with lead conductors attached to the ends of the element which comprises, winding, to form the resistance element, a strand of wire over one of the cover strips and looping it around the ends of a pair of lead-conductors, retaining the loops of wire under yielding tension, measuring the resistance value in the element, varying, by adjustment of the conductors, the length of the wire in the element between the loops around the hooked ends of the conductors relatively to the measured value for the predetermined resistance value desired, joining together the loops on the wire and the hooked ends of the conductors while they are held under tension in their adjusted relation, severing the wire at the outer side of the joints, and cementing the other cover strip over the element after the element has been severed.

6. That improvement in making electrical strain gauges having cover strips with an interlaid resistance element and with lead-conductors attached to the ends of the element which comprises, adjustably supporting a pair of lead-conductors each having one of its ends provided with means through which wire can be looped, winding, to form the resistance element, a strand of wire over a cover strip and looping it around the means on said ends of the lead-conductors, retaining the loops of wire under tension, connecting the other ends of the lead-conductors to the electrical circuit for a resistance measuring instrument, varying, by adjustment of at least one of the conductors, the length of the wire in the element between the conductors to the resistance value desired and relatively to the measured value, and joining together the loops of the wire and the conductors while they are held under tension.

7. That improvement in making electrical strain gauges having cover strips with an interlaid resistance element and with lead-conductors attached to the ends of the element which comprises, adjustably supporting a pair of lead-conductors each having one of its ends provided with means through which wire can be looped, winding, to form the resistance element, a strand of wire over a cover strip and looping it around the means on said ends of the lead-conductors, retaining the loops of wire under tension, connecting the other ends of the lead-conductors to the electrical circuit for a resistance measuring instrument, varying, by adjustment of at least one of the conductors, the length of the wire in the element between the conductors to the resistance value desired and relatively to the measured value, joining together the loops on the wire and the conductors while they are held under tension, and severing the wire from the joints while it remains under tension.

BERNARD J. CAMPBELL.
MARIETTA HILTON.